(12) United States Patent
Diao et al.

(10) Patent No.: US 8,001,068 B2
(45) Date of Patent: Aug. 16, 2011

(54) SYSTEM AND METHOD FOR CALIBRATING AND EXTRAPOLATING MANAGEMENT-INHERENT COMPLEXITY METRICS AND HUMAN-PERCEIVED COMPLEXITY METRICS OF INFORMATION TECHNOLOGY MANAGEMENT

(75) Inventors: Yixin Diao, White Plains, NY (US); Robert Filepp, Westport, CT (US); Robert D. Kearney, Yorktown Heights, NY (US); Alexander Keller, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1472 days.

(21) Appl. No.: 11/422,195

(22) Filed: Jun. 5, 2006

(65) Prior Publication Data

US 2007/0282644 A1    Dec. 6, 2007

(51) Int. Cl.
  *G06F 17/00*  (2006.01)
(52) U.S. Cl. .......................................... 706/45
(58) Field of Classification Search ............ 706/62, 706/12, 45–48
  See application file for complete search history.

(56) References Cited

U.S. PATENT DOCUMENTS

| | | | |
|---|---|---|---|
| 4,835,372 A | 5/1989 | Gombrich et al. |
| 5,504,921 A | 4/1996 | Dev et al. |
| 5,724,262 A | 3/1998 | Ghahramani |
| 5,734,837 A | 3/1998 | Flores et al. |
| 5,765,138 A | 6/1998 | Aycock et al. |
| 5,774,661 A | 6/1998 | Chatterjee et al. |
| 5,826,239 A | 10/1998 | Du et al. |
| 5,850,535 A | 12/1998 | Maystrovsky et al. |
| 5,870,545 A | 2/1999 | Davis et al. |
| 5,884,302 A | 3/1999 | Ho |
| 5,907,488 A | 5/1999 | Arimoto et al. |
| 5,937,388 A | 8/1999 | Davis et al. |
| 6,049,776 A | 4/2000 | Donnelly et al. |
| 6,131,085 A | 10/2000 | Rossides |
| 6,249,769 B1 | 6/2001 | Ruffin et al. |
| 6,259,448 B1 | 7/2001 | McNally et al. |
| 6,263,335 B1 | 7/2001 | Paik et al. |
| 6,308,208 B1 | 10/2001 | Jung et al. |
| 6,339,838 B1 | 1/2002 | Weinman, Jr. |

(Continued)

FOREIGN PATENT DOCUMENTS

WO    2007143516    12/2007

OTHER PUBLICATIONS

"A Capacity Planning Model of Unreliable Multimedia Service Systems", by Kiejin Park and Sungsoo Kim, Department of Software, Anyang University, Kangwha, Incheon, South Korea, Jul. 2001.

(Continued)

*Primary Examiner* — David R Vincent
(74) *Attorney, Agent, or Firm* — Cahn & Samuels, LLP

(57) ABSTRACT

The invention broadly and generally provides a method for calibrating the relationship between management-inherent complexity metrics deriving from the management structure and human perceived complexity of information technology management comprising: (a) obtaining a set of management-inherent complexity metrics; (b) obtaining a set of human-perceived complexity metrics; (c) constructing a control model identifying a set of dominant indicators selected from the aforesaid set of management-inherent complexity metrics; (d) establishing a value model mapping from the aforesaid set of dominant indicators to the aforesaid set of human-perceived complexity metrics.

20 Claims, 5 Drawing Sheets

U.S. PATENT DOCUMENTS

| | | |
|---|---|---|
| 6,363,384 B1 | 3/2002 | Cookmeyer, II et al. |
| 6,453,269 B1 | 9/2002 | Quernemoen |
| 6,473,794 B1 | 10/2002 | Guheen et al. |
| 6,496,209 B2 | 12/2002 | Horii |
| 6,523,027 B1 | 2/2003 | Underwood |
| 6,526,387 B1 | 2/2003 | Ruffin et al. |
| 6,526,392 B1 | 2/2003 | Dietrich et al. |
| 6,526,404 B1 | 2/2003 | Slater et al. |
| 6,618,730 B1 | 9/2003 | Poulter et al. |
| 6,675,149 B1 | 1/2004 | Ruffin et al. |
| 6,738,736 B1 | 5/2004 | Bond |
| 6,789,101 B2 | 9/2004 | Clarke et al. |
| 6,810,383 B1 | 10/2004 | Loveland |
| 6,865,370 B2 | 3/2005 | Ho et al. |
| 6,879,685 B1 | 4/2005 | Peterson et al. |
| 6,907,549 B2 | 6/2005 | Davis et al. |
| 6,970,803 B1 | 11/2005 | Aerdts et al. |
| 6,988,088 B1 | 1/2006 | Miikkulainen et al. |
| 6,988,132 B2 | 1/2006 | Horvitz |
| 7,010,593 B2 | 3/2006 | Raymond |
| 7,039,606 B2 | 5/2006 | Hoffman et al. |
| 7,089,529 B2 | 8/2006 | Sweitzer et al. |
| 7,114,146 B2 | 9/2006 | Zhang et al. |
| 7,177,774 B1 * | 2/2007 | Brown et al. .................. 702/81 |
| 7,236,966 B1 | 6/2007 | Jackson et al. |
| 7,260,535 B2 | 8/2007 | Galanes et al. |
| 7,293,238 B1 | 11/2007 | Brook et al. |
| 7,315,826 B1 | 1/2008 | Guheen et al. |
| 7,364,067 B2 | 4/2008 | Steusloff et al. |
| 7,403,948 B2 | 7/2008 | Ghoneimy et al. |
| 7,412,502 B2 | 8/2008 | Fearn et al. |
| 7,467,198 B2 | 12/2008 | Goodman et al. |
| 7,472,037 B2 * | 12/2008 | Brown et al. ................ 702/182 |
| 7,562,143 B2 | 7/2009 | Fellenstein et al. |
| 7,580,906 B2 | 8/2009 | Faihe |
| 7,707,015 B2 | 4/2010 | Lubrecht et al. |
| 7,802,144 B2 | 9/2010 | Vinberg et al. |
| 2001/0047270 A1 | 11/2001 | Gusick et al. |
| 2002/0019837 A1 | 2/2002 | Balnaves |
| 2002/0055849 A1 | 5/2002 | Georgakopoulos et al. |
| 2002/0091736 A1 | 7/2002 | Wall |
| 2002/0099578 A1 | 7/2002 | Eicher et al. |
| 2002/0111823 A1 | 8/2002 | Heptner |
| 2002/0140725 A1 | 10/2002 | Horii |
| 2002/0147809 A1 | 10/2002 | Vinberg |
| 2002/0161875 A1 | 10/2002 | Raymond |
| 2002/0169649 A1 | 11/2002 | Lineberry et al. |
| 2002/0186238 A1 | 12/2002 | Sylor et al. |
| 2003/0004746 A1 | 1/2003 | Kheirolomoom et al. |
| 2003/0018629 A1 | 1/2003 | Namba |
| 2003/0018771 A1 | 1/2003 | Vinberg |
| 2003/0033402 A1 | 2/2003 | Battat et al. |
| 2003/0065764 A1 | 4/2003 | Capers et al. |
| 2003/0065805 A1 | 4/2003 | Barnes |
| 2003/0097286 A1 | 5/2003 | Skeen |
| 2003/0101086 A1 | 5/2003 | San Miguel |
| 2003/0154406 A1 | 8/2003 | Honarvar et al. |
| 2003/0172145 A1 | 9/2003 | Nguyen |
| 2003/0187719 A1 | 10/2003 | Brocklebank |
| 2003/0225747 A1 | 12/2003 | Brown et al. |
| 2004/0024627 A1 | 2/2004 | Keener |
| 2004/0158568 A1 | 8/2004 | Colle et al. |
| 2004/0172466 A1 | 9/2004 | Douglas et al. |
| 2004/0181435 A9 | 9/2004 | Snell et al. |
| 2004/0186757 A1 | 9/2004 | Starkey |
| 2004/0186758 A1 | 9/2004 | Halac et al. |
| 2004/0199417 A1 | 10/2004 | Baxter et al. |
| 2005/0027585 A1 | 2/2005 | Wodtke et al. |
| 2005/0027845 A1 | 2/2005 | Secor et al. |
| 2005/0066026 A1 | 3/2005 | Chen et al. |
| 2005/0091269 A1 | 4/2005 | Gerber et al. |
| 2005/0114306 A1 | 5/2005 | Shu et al. |
| 2005/0114829 A1 | 5/2005 | Robin et al. |
| 2005/0136946 A1 | 6/2005 | Trossen |
| 2005/0138631 A1 | 6/2005 | Bellotti et al. |
| 2005/0159969 A1 | 7/2005 | Sheppard |
| 2005/0187929 A1 | 8/2005 | Staggs |
| 2005/0203917 A1 | 9/2005 | Freeberg et al. |
| 2005/0223299 A1 | 10/2005 | Childress et al. |
| 2005/0223392 A1 | 10/2005 | Cox et al. |
| 2005/0254775 A1 * | 11/2005 | Hamilton et al. ............... 386/46 |
| 2006/0067252 A1 | 3/2006 | John et al. |
| 2006/0069607 A1 | 3/2006 | Linder |
| 2006/0112036 A1 | 5/2006 | Zhang et al. |
| 2006/0112050 A1 | 5/2006 | Miikkulainen et al. |
| 2006/0129906 A1 | 6/2006 | Wall |
| 2006/0168168 A1 | 7/2006 | Xia et al. |
| 2006/0178913 A1 | 8/2006 | Lara et al. |
| 2006/0184410 A1 | 8/2006 | Ramamurthy et al. |
| 2006/0190482 A1 | 8/2006 | Kishan et al. |
| 2006/0224569 A1 | 10/2006 | DeSanto et al. |
| 2006/0224580 A1 | 10/2006 | Quiroga et al. |
| 2006/0235690 A1 | 10/2006 | Tomasic et al. |
| 2006/0282302 A1 | 12/2006 | Hussain |
| 2006/0287890 A1 | 12/2006 | Stead et al. |
| 2007/0043524 A1 | 2/2007 | Brown et al. |
| 2007/0055558 A1 | 3/2007 | Shanahan et al. |
| 2007/0073576 A1 | 3/2007 | Connors et al. |
| 2007/0073651 A1 | 3/2007 | Imielinski |
| 2007/0083419 A1 | 4/2007 | Baxter et al. |
| 2007/0118514 A1 | 5/2007 | Mariappan |
| 2007/0168225 A1 | 7/2007 | Haider et al. |
| 2007/0219958 A1 | 9/2007 | Park et al. |
| 2007/0234282 A1 | 10/2007 | Prigge et al. |
| 2007/0282470 A1 | 12/2007 | Hernandez et al. |
| 2007/0282622 A1 | 12/2007 | Hernandez et al. |
| 2007/0282645 A1 * | 12/2007 | Brown et al. ..................... 705/7 |
| 2007/0282653 A1 | 12/2007 | Bishop et al. |
| 2007/0282655 A1 | 12/2007 | Jaluka et al. |
| 2007/0282659 A1 | 12/2007 | Bailey et al. |
| 2007/0282692 A1 | 12/2007 | Bishop et al. |
| 2007/0282776 A1 | 12/2007 | Jaluka et al. |
| 2007/0282876 A1 * | 12/2007 | Diao et al. ..................... 707/101 |
| 2007/0282942 A1 | 12/2007 | Bailey et al. |
| 2007/0288274 A1 | 12/2007 | Chao et al. |
| 2007/0292833 A1 | 12/2007 | Brodie et al. |
| 2008/0065448 A1 | 3/2008 | Hull et al. |
| 2008/0109260 A1 | 5/2008 | Roof |
| 2008/0213740 A1 | 9/2008 | Brodie et al. |
| 2008/0215404 A1 * | 9/2008 | Diao et al. ........................ 705/7 |
| 2009/0012887 A1 | 1/2009 | Taub et al. |

OTHER PUBLICATIONS

"Tracking Your Changing Skills Inventory: Why It's Now Possible, and What It Means for Your Organization", from CIO.com, Mid 2002 IT Staffing Update, Brainbench.

"Project MEGAGRID: Capacity Planning for Large Commodity Clusters", An Oracle, Dell, EMC, Intel Joint White Paper, Dec. 2004.

Ganesarajah, Dinesh and Lupu Emil, 2002, Workflow-based composition of web-services: a business model or programming paradigm?, IEEE Computer Society.

M.D. Harrison, P.D. Johnson and P.C. Wright. "Relating the automation of functions in multi-agent control systems to a system engineering representation." Department of Computer Science, University of York, Heslington, York. UK. Aug. 13, 2004.

"Self-Adaptive SLA-Driven Capacity Management for Internet Services", by Bruno Abrahao et al., Computer Science Department, Federal University of Minas, Gerais, Brazil, 2005.

zur Muehlen, Michael. "Resource Modeling in Workflow Applications", 1999.

BEA Systems, Inc., "BEA White Paper—BEA AquaLogic Service Bus—IT's Direct Route to SOA," printout from http://www.bea.com/content/news_events/white_papers/BEA_AQL_ServiceBus_wp.pdf, Jun. 2005.

Cape Clear Software, Inc., "Cape Clear 6.5", printout from http://www.capeclear.com/download/CC65_Broch.pdf, copyright notice 2005.

Cordys, "Cordys Enterprise Service Bus—Capabilities," printout from http://www.cordys.com/en/Products/Cordys_ESB_capabilities.htm, printed on Jun. 26, 2006.

Oracle, "Enterprise Service Bus," printout from http://www.oracle.com/appserver/esb.html, printed on Jun. 27, 2006.

PolarLake Limited, "Enterprise Service Bus (ESB) Resource Center," printout from http://www.polarlake.com/en/html/resources/esb/, printed on Jun. 27, 2006, copyright notice dated 2006.
Sonic Software, "ESB Architecture & Lifecycle Definition," printout from http://www.sonicsoftware.com/products/sonic_esb/architecture_definition/index.ssp, printed on Jun. 26, 2006.
Mercury, Mercury Capacity Planning (Powered by Hyperformix), 2004.

Team Quest, Capacity Planning with TeamQuest Analytic Modeling Software, printed from http://www.teamquest.com/solutions-products/solutions/planning-provis . . . on Jun. 4, 2006.

* cited by examiner

FIG. 1 Overall Architecture for Complexity Calibration and

FIG.3 Overall Process of Complexity Extrapolation

FIG.4 Logical Structure of the Value Model

SYSTEM AND METHOD FOR CALIBRATING AND EXTRAPOLATING MANAGEMENT-INHERENT COMPLEXITY METRICS AND HUMAN-PERCEIVED COMPLEXITY METRICS OF INFORMATION TECHNOLOGY MANAGEMENT

FIELD OF THE INVENTION

The present invention relates generally to computing system evaluation and, more particularly, to techniques for quantitatively measuring and benchmarking complexity in information technology management.

BACKGROUND OF THE INVENTION

The complexity of managing computing systems and information technology (IT) processes represents a major impediment to efficient, high-quality, error-free, and cost-effective service delivery ranging from small-business servers to global-scale enterprise backbones. IT systems and processes with a high degree of complexity demands human resources and expertise to manage that complexity, increasing the total cost of ownership. Likewise, complexity increases the amount of time that must be spent interacting with a computing system or between operators to perform the desired function, and decreases efficiency and productivity. Furthermore, complexity results in human errors, as complexity challenges human reasoning and results in erroneous decisions even by skilled operators.

Due to the high complexity level incurred in service delivery processes, it is evident that service providers are actively seeking to reduce the IT complexity by designing, architecting, implementing, and assembling systems and processes with minimal complexity level. In order to do so, they must be able to quantitatively measure and benchmark the degree of IT management complexity exposed by particular computing systems or processes, so that global delivery executives, program mangers, and project leaders can evaluate the prospective complexity before investing in them, and designers, architects, and developers can rebuild and optimize them for reduced complexity. Besides improving decision making for projects and technologies, quantitative complexity evaluation can help computing service providers and outsourcers quantify the amount of human management that will be needed to provide a given service, allowing them to more effectively evaluate costs and set price points. All these scenarios require standardized, representative, accurate, easily-compared quantitative assessments of IT management complexity with metrics mapped to human-perceived complexity such as labor cost, efficiency, and error rate. This motivates the need for a system and methods for calibrating and extrapolating complexity metrics of information technology management.

The prior art of computing system evaluation includes no system or methods for calibrating and extrapolating complexity metrics of information technology management. Well-studied computing system evaluation areas include system performance analysis, software complexity analysis, human-computer interaction analysis, dependability evaluation, and basic complexity evaluation.

System performance analysis attempts to compute quantitative measures of the performance of a computer system, considering both hardware and software components. This is a well-established area rich in analysis techniques and systems. However, none of these methodologies and systems for system performance analysis considers complexity-related aspects of the system under evaluation, nor do they collect or analyze complexity-related data. Therefore, system performance analysis provides no insight into the complexity of the IT management being evaluated.

Software complexity analysis attempts to compute quantitative measures of the complexity of a piece of software code, considering both the intrinsic complexity of the code, as well as the complexity of creating and maintaining the code. However, processes for software complexity analysis do not collect management-related statistics or data and therefore provides no insight into the management complexity of the computing systems and processes running the analyzed software.

Human-computer interaction (HCI) analysis attempts to identify interaction problems between human users and computer systems, typically focusing on identifying confusing, error-prone, or inefficient interaction patterns. However, HCI analysis focuses on detecting problems in human-computer interaction rather than performing an objective, quantitative complexity analysis of that interaction. HCI analysis methods are not designed specifically for measuring management complexity, and typically do not operate on management-related data. In particular, HCI analysis collects human performance data from costly observations of many human users, and does not collect and use management-related data directly from a system under test. Additionally, HCI analysis typically produces qualitative results suggesting areas for improvement of a particular user interface or interaction pattern. Thus, it does not produce quantitative results that evaluate an overall complexity of managing a system, independent of the particular user interface experience. The Model Human Processor approach to HCI analysis does provide objective, quantitative results; however, these results quantify interaction time for motor-function tasks like moving a mouse or clicking an on-screen button, and thus do not provide insight into the complexity of managing computing system and service management.

Dependability evaluation combines aspects of objective, reproducible performance benchmarking with HCI analysis techniques with a focus on configuration-related problems, see, e.g., Brown et al., "Experience with Evaluating Human-Assisted Recovery Processes," Proceedings of the 2004 International Conference on Dependable Systems and Networks, Los Alamitos, Calif., IEEE, 2004. This approach includes a system for measuring configuration quality as performed by human users, but does not measure configuration complexity and does not provide reproducibility or objective measures.

Basic complexity evaluation quantitatively evaluates complexity of computing system configuration, see, e.g., Brown et al., "System and methods for quantitatively evaluating complexity of computing system configuration," Ser. No. 11/205,972, filed on Aug. 17, 2005, and Brown et al., "System and methods for integrating authoring with complexity analysis for computing system operation procedures." However, they do not provide metrics calibration that map configuration-related data directly from a system under test to human-perceived complexity such as labor cost, efficiency, and error rate.

SUMMARY OF THE INVENTION

The invention broadly and generally provides a method for calibrating the relationship between management-inherent complexity metrics deriving from the management structure and human perceived complexity of information technology management comprising: (a) obtaining a set of management-inherent complexity metrics; (b) obtaining a set of human-perceived complexity metrics; (c) constructing a control model identifying a set of dominant indicators selected from the aforesaid set of management-inherent complexity metrics; (d) establishing a value model mapping from the aforesaid set of dominant indicators to the aforesaid set of human-perceived complexity metrics.

The method may further comprise obtaining and validating the aforesaid control model and the aforesaid value model for quality assessment. This step may be repeated.

In some embodiments, the aforesaid set of management-inherent complexity metrics comprise at least one of: (a) execution complexity metrics; (b) parameter complexity metrics; and (c) memory complexity metrics.

In some embodiments, the aforesaid value model may be constructed using a statistical approach or linear regression.

In some embodiments, the aforesaid value model is constructed using machine learning, an artificial neural network, for example. This artificial neural network may be a radial basis function.

Advantageously, the aforesaid step of obtaining a set of management inherent complexity metrics may comprise at least one of: (a) obtaining management-inherent complexity metrics from a complexity analysis; and (b) acquiring human-perceived complexity metrics through controlled user studies.

The aforesaid step of constructing a control model may comprise at least one of: (a) obtaining a subset of management-inherent complexity metrics as a set of dominant indicators under study; (b) constructing a value model from the aforesaid set of dominant indicators and the aforesaid set of human-perceived complexity metrics based on a set of information technology management data; and (c) evaluating the quality of the aforesaid value model based on a different set of information technology management data.

The method may further comprise obtaining a different subset of management-inherent complexity metrics from the aforesaid set of dominant indicators under study. This step may be repeated until no better set of dominant indicators is found.

The invention further broadly and generally provides a method for extrapolating from management-inherent complexity metrics to human-perceived complexity of information technology management, the aforesaid method comprising: (a) collecting a set of management-inherent complexity metrics; (b) obtaining a value model; (c) predicting human-perceived complexity based on the aforesaid set of management inherent complexity metrics and the aforesaid value model.

The invention further broadly and generally provides a program storage device readable by a digital processing apparatus and having a program of instructions which are tangibly embodied on the storage device and which are executable by the processing apparatus to perform a method for calibrating the relationship between management-inherent complexity metrics deriving from the management structure and human perceived complexity of information technology management, the aforesaid method comprising: (a) obtaining a set of management-inherent complexity metrics; (b) obtaining a set of human-perceived complexity metrics; (c) constructing a control model identifying a set of dominant indicators selected from the aforesaid set of management-inherent complexity metrics; (d) establishing a value model mapping from the aforesaid set of dominant indicators to the aforesaid set of human-perceived complexity metrics.

DETAILED DESCRIPTION OF PREFERRED EMBODIMENT

Exemplary embodiments of the invention as described herein generally include system or methods for calibrating and extrapolating complexity metrics of information technology management.

For illustrative purposes, exemplary embodiments of the invention will be described with specific reference, if needed, to calibrating and extrapolating complexity metrics of information technology management of a configuration procedure, wherein the management-inherent complexity metrics deriving from the management structure comprise one or more execution complexity metrics, parameter complexity metrics, and/or memory complexity metrics, and human-perceived complexity metrics comprise one of more cost metrics, efficiency metrics, and quality metrics. It is to be understood, however, that the present invention is not limited to any particular kind of information technology management. Rather, the invention is more generally applicable to any information technology management in which it would be desirable to conduct complexity model calibration and extrapolation.

It is to be understood that the system and methods described herein in accordance with the present invention may be implemented in various forms of hardware, software, firmware, special purpose processors, or a combination thereof. Preferably, the present invention is implemented in software comprising program instructions that are tangibly embodied on one or more program storage devices (e.g., hard disk, magnetic floppy disk, RAM, CD ROM, DVD, ROM and flash memory), and executable by any device or machine comprising suitable architecture.

It is to be further understood that because the constituent system modules and method steps depicted in the accompanying Figures can be implemented in software, the actual connections between the system components (or the flow of the process steps) may differ depending upon the manner in which the application is programmed. Given the teachings herein, one of ordinary skill in the related art will be able to contemplate these and similar implementations or configurations of the present invention.

Figure 1:
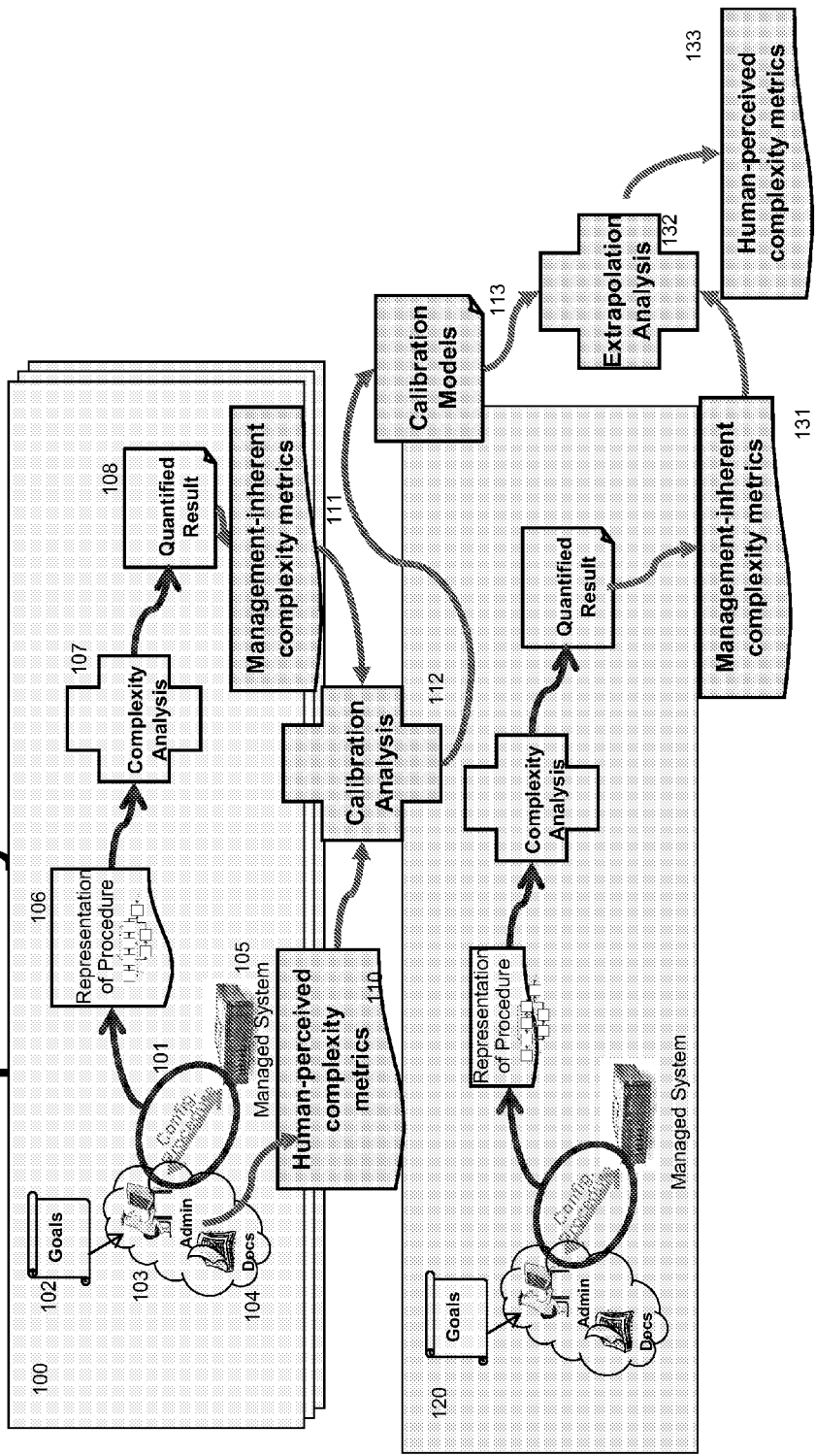
FIG. 1 is a block diagram illustrating the overall architecture for complexity calibration and extrapolation.

FIG. 1 is a block diagram illustrating the overall architecture for complexity calibration and extrapolation. FIG. 1 depicts one or more data processing systems (100) that collect and evaluate configuration related data utilizing techniques taught in U.S. patent application Ser. No. 11/205,972 filed on Aug. 17, 2005. This comprises observing the configuration procedure (101) between the system administrator (103) and the managed system (105) based on configuration goals (102) and authoritative documentation sources (104), documenting the representation of procedure (106), conducting analysis (107), and outputting the quantified results (108).

An exemplary embodiment of the present invention begins by obtaining (or collecting) a set of human-perceived complexity metrics (110) from the system administrator (103) through user studies, for example, and obtaining a set of management-inherent complexity metrics (111) from complexity evaluation quantified result (108). Thereafter, the calibration analysis (112) is conducted to generate calibration models (113) which quantify the relationship between management-inherent complexity metrics and human-perceived complexity of the configuration procedure.

A different data processing system (120) that collects and evaluates configuration related data utilizing techniques is taught in U.S. patent application Ser. No. 11/205,972 filed on Aug. 17, 2005. The present invention, without collecting again a set of human-perceived complexity metrics from the system administrator through user studies (which can be costly or even not feasible), conducts extrapolation analysis (132) that is based on the set of management-inherent complexity metrics (131) from the data processing system (120) and the calibration models (113) from calibration analysis (112) to generate the human-perceived complexity metrics (133).

Figure 2:
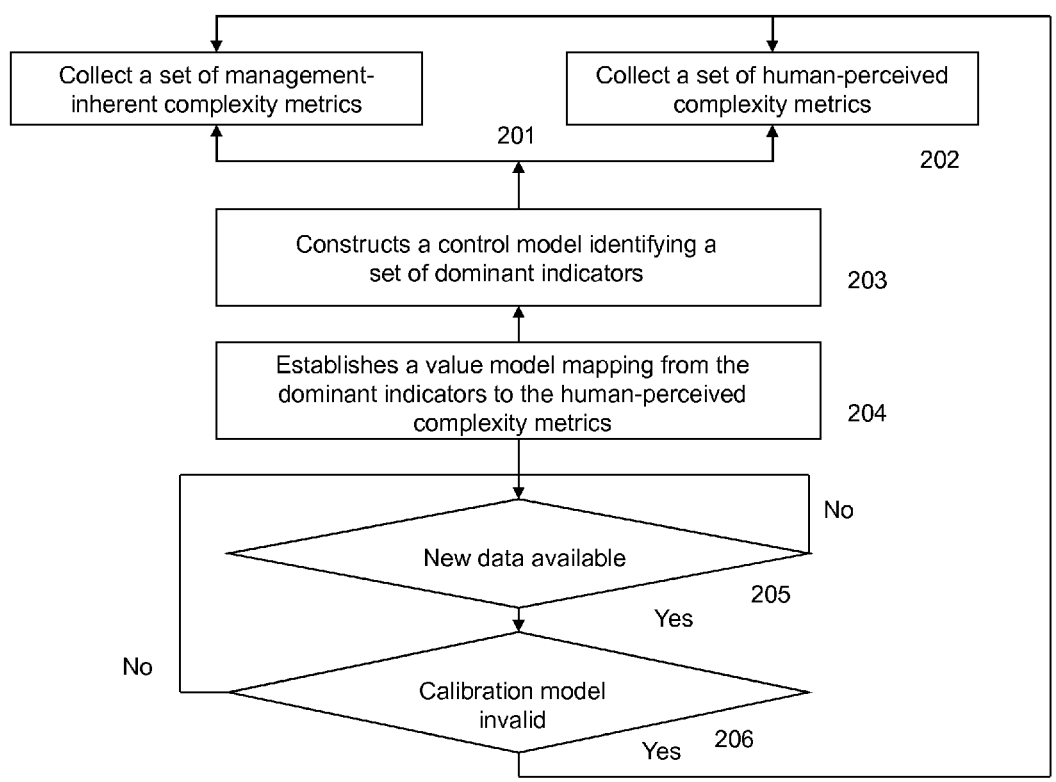
FIG. 2 is a flow diagram illustrating the overall process for complexity calibration.

FIG. 2 is a flow diagram illustrating the overall process for complexity calibration. To calibrate the relationship between management-inherent complexity metrics and human-perceived complexity of information technology management, a system following a method consistent with the present invention collects a set of management-inherent complexity metrics (201), collects a set of human-perceived complexity metrics (202), and constructs a control model identifying a set of dominant indicators (203) which are selected from the set of management-inherent complexity metrics collected in (201) and are most related to said set of human-perceived complexity metrics collected in (202). After that, it establishes a value model that maps from the dominant indicators to the human-perceived complexity metrics (204). The above process is repeated if new data is available (205) and the constructed calibration models including the control model from (203) and the value model from (204) are not valid.

Figure 3:
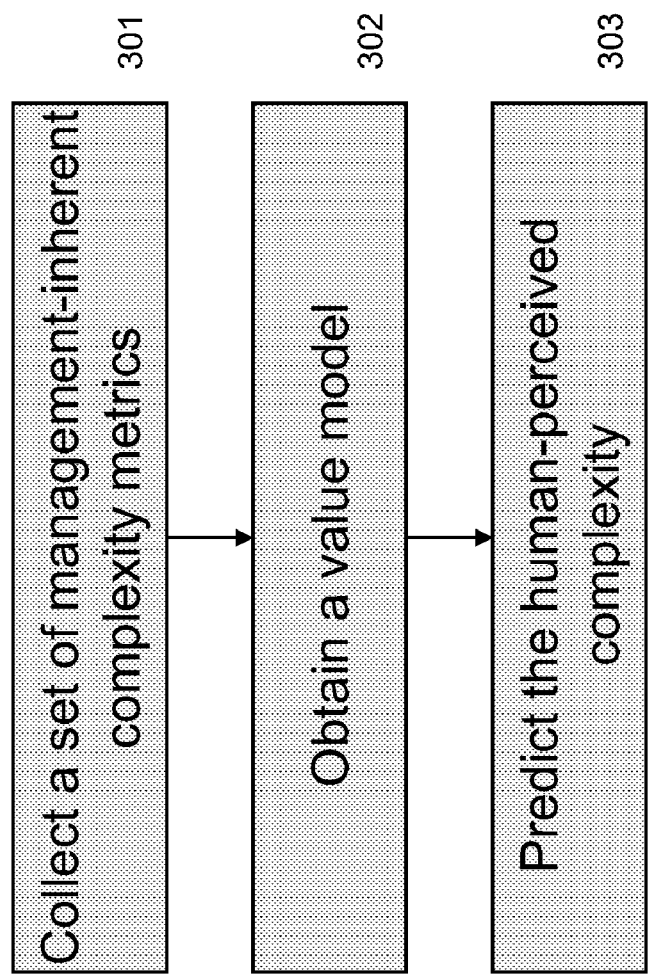
FIG. 3 is a flow diagram illustrating the overall process for complexity extrapolation.

FIG. 3 is a flow diagram illustrating the overall process for complexity extrapolation. FIG. 3 depicts the process of extrapolating from management-inherent complexity metrics to human-perceived complexity of information technology management when human-perceived complexity metrics are not available. A system following a method consistent with the present invention collects a set of management-inherent complexity metrics (301), obtains a value model (302) which is from (204), and predicts the human-perceived complexity (303) based on the above set of management-inherent complexity metrics and the value model.

Figure 4:
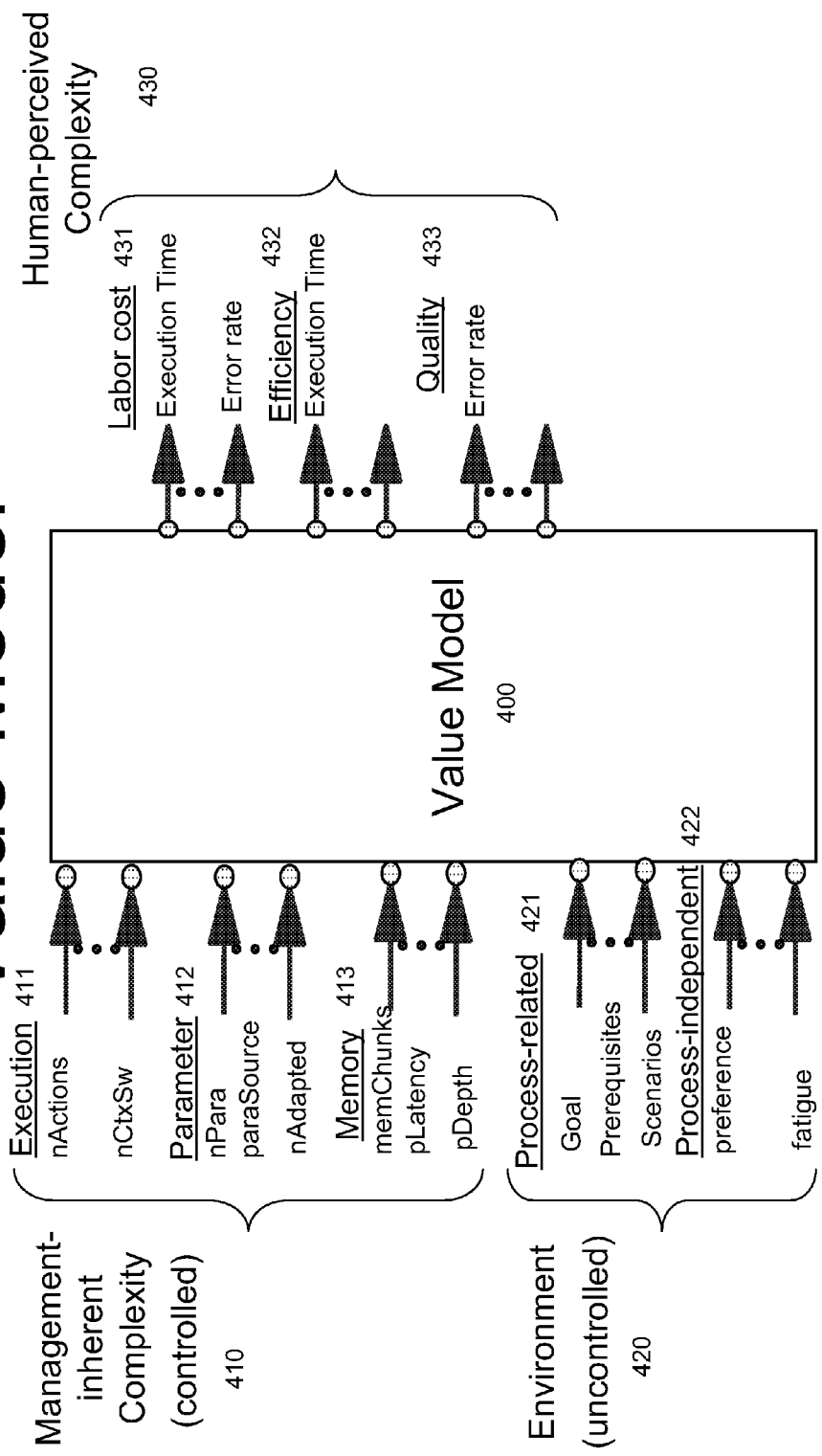
FIG. 4 is a block diagram illustrating the logical structure of the value model.

FIG. 4 is a block diagram illustrating the logical structure of the value model. The value model (400) has model inputs including one or more management-inherent complexity metrics (410), and one or more environment metrics (420), and has model outputs including one or more human-perceived complexity metrics (430). The management-inherent complexity metrics (410) comprises one or more of execution complexity metrics (411), parameter complexity metrics (412), and memory complexity metrics (413). The human-perceived complexity metrics comprises one or more of metrics on labor cost (431), efficiency (432), and quality (433).

The value model can be constructed using statistical approaches or machine learning approaches. For example, a linear regression model can be constructed $$ET=b0+b1*nActions+b2*nCtxSw$$

where the model inputs includes the explanatory variables such as the number of actions (nActions) and the number of context switches (nCtxSw), and the model outputs includes the execution time (ET). The model coefficients such as b0, b1, b2 can be obtained using least squares approach.

Alternatively, a type of neural networks called radial basis function network can be constructed $$ET=RBF(nActions, nCtxSw, \ldots, goal, \ldots)$$

which can be used to build a nonlinear relationship, and can further comprises environment variables to classify the different IT management types to build a higher quality of model.

Figure 5:
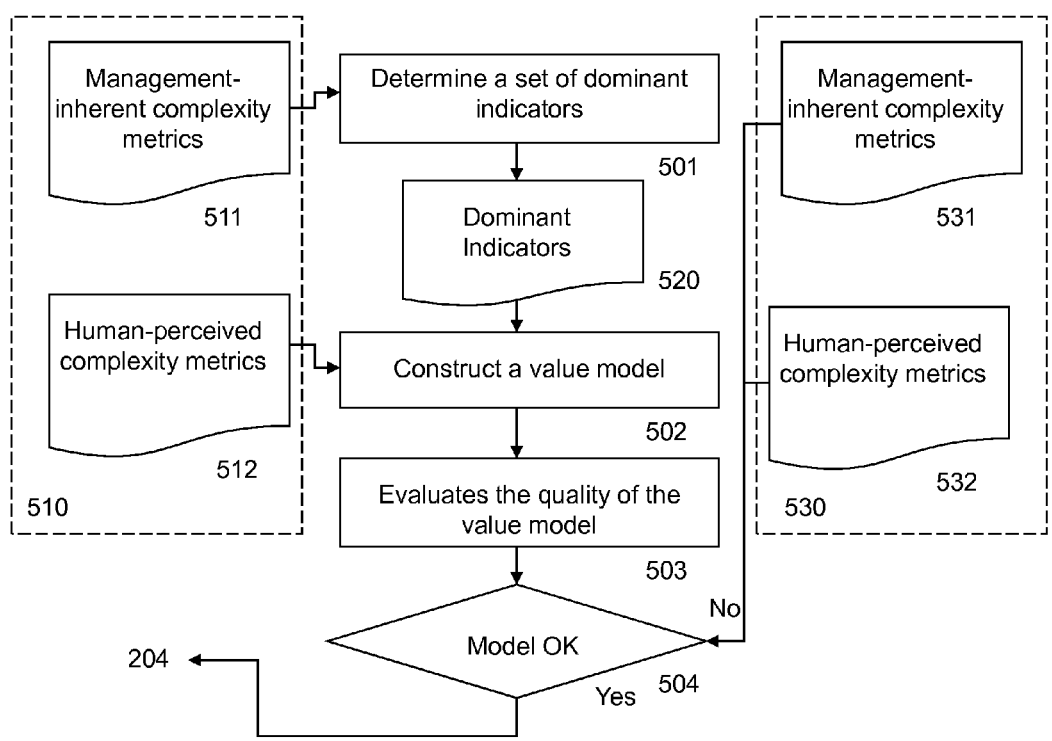
FIG. 5 is a flow diagram illustrating the operation of the control model for identifying dominant indicators.

FIG. 5 is a flow diagram illustrating the operation of the control model for identifying dominant indicators. FIG. 5 depicts the step of constructing a control model identifying a set of dominant indicators selected from the above set of management-inherent complexity metrics that mostly related to said set of human-perceived complexity metrics. A system performing a method consistent with the present invention obtains a subset of management-inherent complexity metrics (511) as a set of dominant indicators (520) under study (501), and constructs a value model (502) from this set of dominant indicators (520) and the set of human-perceived complexity metrics (512) based on a set of information technology management data (510). Afterwards, the system evaluates the quality of the value model (503) based on a different set of information technology management data (530) including both management-inherent complexity metrics (531) and human-perceived complexity metrics (532). Based on the quality of the value model (504), it may require a different subset of management-inherent complexity metrics as said set of dominant indicators under study; otherwise, it can perform the step of establishing a value model mapping from the dominant indicators to the human-perceived complexity metrics (204).

While changes and variations to the embodiments may be made by those skilled in the art, the scope of the invention is to be determined by the appended claims.

What is claimed is:

1. A method for calibrating the relationship between management-inherent complexity metrics deriving from the management structure of a system and human-perceived complexity of information technology management, said method comprising:
    obtaining a set of management-inherent complexity metrics from quantified results of a complexity analysis, the complexity analysis quantifying a complexity of a configuration procedure between the system and an administrator of the system;
    obtaining a set of human-perceived complexity metrics from user studies from the administrator of the system;
    constructing a control model on a first processor, said control model identifying a set of dominant indicators selected from said set of management-inherent complexity metrics;
    establishing a value model on a second processor, said value model mapping from said set of dominant indicators selected from said set of management-inherent complexity metrics to said set of human-perceived complexity metrics.

2. The method as set forth in claim 1, further comprising:
    obtaining and validating said control model and said value model for quality assessment; and
    repeating said obtaining and validating said control model and said value model for quality assessment.

3. The method as set forth in claim 1, wherein said set of management-inherent complexity metrics comprise at least one of:
    execution complexity metrics;
    parameter complexity metrics; and
    memory complexity metrics.

4. The method as set forth in claim 1, wherein said value model is constructed using at least one of:

a statistical approach;
linear regression;
machine learning; and
an artificial neural network, wherein said artificial neural network is a radial basis function.

5. The method as set forth in claim 1, wherein said step of constructing a control model comprises at least one of:
   (a) obtaining a subset of management-inherent complexity metrics as a set of dominant indicators under study;
   (b) constructing a value model from said set of dominant indicators and said set of human-perceived complexity metrics based on a set of information technology management data; and
   (c) evaluating the quality of said value model based on a different set of information technology management data.

6. The method as set forth in claim 5, further comprising obtaining a different subset of management-inherent complexity metrics from said set of dominant indicators under study.

7. The method as set forth in claim 6, further comprising repeating said step of obtaining a different subset of management-inherent complexity metrics as said set of dominant indicators under study until no better set of dominant indicators is found.

8. A method for extrapolating from management-inherent complexity metrics to human-perceived complexity of information technology management, said method comprising:
   collecting a set of management-inherent complexity metrics from quantified results of a complexity analysis, the complexity analysis quantifying a complexity of a configuration procedure between the system and an administrator of the system;
   obtaining a value model;
   predicting human-perceived complexity with a processor, the human-perceived complexity being based on said set of management inherent complexity metrics and said value model, said predicting including:
      inputting the management-inherent complexity metrics into the value model; and
      outputting human-perceived complexity metrics from the value model.

9. A program storage device readable by a digital processing apparatus and having a program of instructions which are tangibly embodied on the storage device and which are executable by the processing apparatus to perform a method for calibrating the relationship between management-inherent complexity metrics deriving from the management structure of a system and human-perceived complexity of information technology management, said method comprising:
   obtaining a set of management-inherent complexity metrics from quantified results of a complexity analysis, the complexity analysis quantifying a complexity of a configuration procedure between the system and an administrator of the system;
   obtaining a set of human-perceived complexity metrics from user studies from the administrator of the system;
   constructing a control model on a first processor, said control model identifying a set of dominant indicators selected from said set of management-inherent complexity metrics; and
   establishing a value model on a second processor, said value model mapping from said set of dominant indicators to said set of human-perceived complexity metrics.

10. The method as set forth in claim 1, further comprising:
   inputting the management-inherent complexity metrics into the value model; and
   outputting a second set of human-perceived complexity metrics from the value model.

11. The method as set forth in claim 10, wherein at least one of the set of human-perceived complexity metrics and the second set of human-perceived complexity metrics each comprise at least one of cost metrics, efficiency metrics, and quality metrics.

12. The method as set forth in claim 10, further including inputting into the value model uncontrolled environment metrics to classify different information technology management types, the uncontrolled environment metrics comprising process-related metrics and process-independent metrics, the process-related metrics including at least one of goal metrics, prerequisite metrics, and scenario metrics, the process-independent metrics including at least one of preference metrics and fatigue metrics.

13. The method as set forth in claim 4, wherein inputs of said linear regression comprise a number of actions and a number of context switches, wherein outputs of said linear regression comprise an execution time, and wherein coefficients of said linear regression are obtained using a least squares approach.

14. The method as set forth in claim 4, wherein said radial basis function builds a nonlinear relationship, the radial basis function comprising environment variables to classify different information technology management types.

15. The method as set forth in claim 8, wherein said management-inherent complexity metrics comprise at least one of:
   execution complexity metrics;
   parameter complexity metrics; and
   memory complexity metrics.

16. The method as set forth in claim 8, wherein the human-perceived complexity metrics comprise at least one of cost metrics, efficiency metrics, and quality metrics.

17. The method as set forth in claim 8, further including inputting into the value model uncontrolled environment metrics to classify different information technology management types, the uncontrolled environment metrics comprising process-related metrics and process-independent metrics, the process-related metrics including at least one of goal metrics, prerequisite metrics, and scenario metrics, the process-independent metrics including at least one of preference metrics and fatigue metrics.

18. The method as set forth in claim 8, wherein said obtaining of the value model comprises constructing a linear regression model, wherein inputs of said linear regression model comprise a number of actions and a number of context switches, wherein outputs of said linear regression model comprise an execution time, and wherein coefficients of said linear regression model are obtained using a least squares approach.

19. The method as set forth in claim 8, wherein said obtaining of the value model comprises constructing a radial basis function neural network for building a nonlinear relationship, the radial basis function neural network comprising environment variables to classify different IT management types.

20. The program storage device as set forth in claim 9, further comprising:
   inputting the management-inherent complexity metrics into the value model, wherein the management-inherent complexity metrics comprises:
      execution complexity metrics,
      parameter complexity metrics, and
      memory complexity metrics; and
   outputting a second set of human-perceived complexity metrics from the value model, wherein the first set of human-perceived complexity metrics and the second set of human-perceived complexity metrics each comprises:
cost metrics,
efficiency metrics, and
quality metrics.

* * * * *